US005432139A

United States Patent [19]

Shamshoum et al.

[11] Patent Number: 5,432,139
[45] Date of Patent: Jul. 11, 1995

[54] CATALYST FORMULATION AND POLYMERIZATION PROCESS

[75] Inventors: Edwar S. Shamshoum, Houston; David J. Rauscher, Webster; Shabbir A. Malbari, Pasadena, all of Tex.

[73] Assignee: Fina Technology, Inc., Dallas, Tex.

[21] Appl. No.: 846,540

[22] Filed: Mar. 4, 1992

[51] Int. Cl.⁶ ............................................. B01J 31/00
[52] U.S. Cl. .................... 502/125; 502/108; 502/117; 502/103; 526/136; 585/512
[58] Field of Search .............. 502/108, 117, 125, 103; 585/512

[56] References Cited

U.S. PATENT DOCUMENTS

| | | | |
|---|---|---|---|
| 4,767,735 | 8/1988 | Ewen et al. | 502/109 |
| 5,013,701 | 5/1991 | Coosmans et al. | 502/110 |
| 5,122,583 | 6/1992 | Ewen et al. | 502/104 |

*Primary Examiner*—Asok Pal
*Attorney, Agent, or Firm*—William D. Jackson; Jim D. Wheelington; M. Norwood Cheairs

[57] ABSTRACT

Processes for the formulation of Ziegler-type catalysts from a transition metal component, an electron donor and a co-catalyst which are sequentially mixed together. The co-catalyst is initially contacted with either of the transition metal catalyst or the electron donor for a first contact time of 5–120 seconds. This mixture is then contacted with the remainder of the electron donor or transition metal component for a second contact time of less and 110 seconds. The three component system is then used in olefin polymerization. The olefin contacting step can involve an initial pre-polymerization reaction. A specific order of addition involves mixture of the transition metal component and the co-catalyst component for a contact time of 5–120 seconds followed by contact with an electron donor component for no more than 30 seconds. Another order of addition involves initially contacting the electron donor with the co-catalyst. A further order of addition is such that the electron donor is initially contacted with the transition metal component for up to 40 seconds. The resulting mixture is then contacted with the co-catalyst component for a shorter second contact time up to 20 seconds.

36 Claims, 2 Drawing Sheets

CATALYST FORMULATION AND POLYMERIZATION PROCESS

FIELD OF THE INVENTION

This invention relates to the polymerization of unsaturated hydrocarbons over Ziegler-type catalysts, and more particularly, to processes for formulating such catalysts by sequentially mixing the various components thereof and controlling the orders of addition and the durations of mixing such catalyst components.

BACKGROUND OF THE INVENTION

The polymerization of unsaturated hydrocarbons over Ziegler-type catalysts is well known in the art. Such hydrocarbons normally take the form of short chain alpha olefins such as ethylene, propylene and butylene, including substituted alpha olefins such as substituted vinyl compounds, for example, vinyl chloride or vinyl toluene. However, such unsaturated hydrocarbons can also include di-olefins such as 1-3-butadiene or 1-4-hexadiene or acetylenically unsaturated compounds such as methylacetylene or 2-butyne.

Ziegler-type catalysts incorporate a transition metal, usually titanium, zirconium or hafnium, although other transition metals found in Groups 4, 5 and 6 of the Periodic Table of Elements may be employed, which function to provide sites for the insertion of monomer units into growing polymer chains. One type of such polymerization catalysts are the so-called homogeneous catalyst systems in which the transition metal compound is a metallocene comprising one or more substituted or unsubstituted cyclopentadienyl groups coordinated with the transition metal atom forming the situs for polymer growth. Such metallocene-based catalyst systems are the subject of European Patent Application EP 129,368 and U.S. Pat. Nos. 4,794,096 to Ewen and 4,892,851 to Ewen et al., the latter two patents disclosing catalysts useful in the polymerization of propylene to form isotactic or syndiotactic polypropylene.

The more widely used transition metal catalysts are the so-called heterogeneous catalyst systems in which a transition metal halide, usually zirconium, hafnium or titanium, di-, tri-, or tetra-halides, are incorporated with a support structure, principally based upon magnesium or zinc halides, ethoxides or the like. For example, U.S. Pat. No. 4,476,289 to Mayr et al. discloses so-called "activated" titanium tetrahalides, more specifically, titanium tetrachloride, supported on anhydrous magnesium or zinc halides, principally magnesium chloride or magnesium bromide. The transition metal component is used in conjunction with a second component, commonly referred to as a co-catalyst, which as described in the Mayr et al. patent, is a hydride or organometallic compound based primarily upon aluminum, although lithium or magnesium based compounds are also disclosed. A supported catalyst containing yet another component is disclosed in U.S. Pat. No. 4,636,486 to Mayr et al. Here, the titanium compound, which may be a halide, an oxyhalide or an alcoholate in either the di-, tri-, or tetravalent form, is composited with the magnesium support, together with an electron donor compound. Such electron donors, commonly referred to as internal electron donors because they are incorporated as part of the transition metal catalyst component, can be selected from a broad class of compounds including amines, amides, phosphines, ethers, thioethers, alcohol esters, aldehydes, and ketones. As in the case of the aforementioned Patent No. 4,476,289 to Mayr, the catalyst system here also includes a co-catalyst such as triethylaluminum, commonly referred to as TEAL.

Yet a third component often employed in Ziegler-type catalyst systems is a so-called external electron donor. The external electron donors function similarly as the internal electron donors and in a complimentary or supplementary manner to regulate monomer insertion into the polymer chain growing on the transition metal active sites. Thus, the electron donors can have an impact upon catalyst activity, polymer molecular weight, and polymer morphology as reflected in stereospecificity and physical parameters such as melting point. For example, in the polymerization of propylene, the addition of electron donors under controlled conditions can result in dramatic increases in activity (the amount of polymer produced per unit of catalyst) and in stereoregularity, e.g., an increase in isotactic polymer with a corresponding decrease in atactic.

The complimentary nature of the internal and external electron donors is addressed in Soga, K. et al., "Effect of Diesters and Organosilicon Compounds on the Stability and Stereospecificity of Ziegler-Natta Catalysts", Transition Metal Catalyzed Polymerizations: Ziegler-Natta and Metathesis Polymerizations, Quirk, R.P., Ed., Cambridge University Press, New York, 1988, pp. 266–279. As discussed in Soga, the concentrations of the internal and external donors in the catalyst system can be adjusted in order to optimize the activity and the stereospecifity of the catalyst. In the experimental work reported there, the transition metal catalyst component comprising titanium tetrachloride supported on magnesium dichloride with an internal donor, e.g., di-N butylphthalate, was slurried in hexane followed by the addition of an external electron donor, phenyl tri-ethoxysilane, and triethylaluminum (TEA) co-catalyst. Soga et al. report on polymerization rates over periods of several hours and isotactic indices measured over periods of several hours for various internal, external catalyst systems at varying concentrations expressed in terms of silicon titanium mole ratios and TEA/titanium mole ratios.

U.S. Pat. No. 4,287,328 to Kikuta et al., is directed to the polymerization of alpha olefins in the presence of multi-component catalyst systems involving a "solid product" combined with an organoaluminum compound including, for example, $C_1$–$C_{10}$ trialkylaluminum, triethylaluminum, alkyl alkyoxyaluminums, and alkylaluminum halides, and an electron donor including various organic acids, alcohols, ethers, aldehydes, ketones, amines, alkenol amines, esters, phosphines, phosphites, thioethers, thioalcohols, silanes, and siloxanes. The "solid product" catalyst component is formed by reacting a trivalent metal halide such as aluminum trichloride, aluminum tribromide or ferric trichloride with a divalent metal compound such as magnesium, calcium, or zinc hydroxide or oxide or carbonate with titanium tetrachloride, characterized as an electron acceptor. Numerous orders of additions of the various components are described in Kikuta et al.., especially in columns 6 through 9. Conditions of mixing can vary over wide temperature ranges and time intervals, but temperatures are preferably in the range of room temperature to about 100° C. The mixing of the various components can be carried out over periods of several minutes to several hours.

U.S. Pat. No. 4,567,155 to Tovrog et al., discloses multi-component catalyst systems useful in the gas phase polymerization of alpha olefins. In Tovrog et al., the catalyst systems comprise two base catalyst components, each containing subcomponents. The first component, identified as component "A" comprises a titanium component supported on a hydrocarbon insoluble magnesium component in combination with an electron compound. The second major component is a co-catalyst component, characterized as component "B" comprising a trialkylaluminum, an aromatic acid ester and an unhindered secondary amine. Tovrog discloses that the catalyst components may be mechanically activated by comminution prior to use in polymerization. Comminuted catalysts may be pre-polymerized with an alpha olefin before use as a polymerization catalyst component. In the pre-polymerization procedure, comminuted catalysts and an organoaluminum compound co-catalyst are contacted with an alpha olefin under polymerization conditions and preferably in the presence of a modifier such as methyt-p-toluate and an inert hydrocarbon such as hexane, with typical time durations for prepolymerization and other pretreatment procedures involving periods of minutes up to a few hours.

U.S. Pat. No. 4,767,735 to Ewen et al. discloses a pre-polymerization process carried out over a period of less than a minute and usually ten seconds or less. In the Ewen et al. procedure, an organic solvent stream such as hexane or heptane is established in a pre-mixing line. To this stream are added sequentially a co-catalyst (TEAL), an external electron donor (diphenyldimethyoxysilane) and a supported catalyst component (titanium tetrachloride supported on magnesium dichloride) to form a catalyst system which is then pre-polymerized by contact with propylene for a few seconds. An alternative mode of addition in the Ewen et al. procedure is to add the electron donor to the carrier stream after the addition of the titanium catalyst component, but still before the addition of the propylene. Ewen et al. disclose that the cocatalyst should be present when the electron donor and the transition metal catalyst component contact one another in order to avoid poisoning of the titanium catalyst. High efficiency catalyst systems employing external electron donors which-may be characterized generally as sec or tert alkyl or cycloalkyl, alkyl dialkoxy silanes in combination with titanium tetrachloride supported on magnesium based supports derived from dialkoxy magnesium compounds are disclosed in Patent 4,927,797 to Ewen. By way of example, the supported catalyst may be formulated through the reaction of diethoxy magnesium, titanium tetrachloride, and no-butyl phthalate under appropriate conditions as specified in the patent. A suitable external electron donor here is methylcyclohexyl dimethoxysilane which is compared with diphenyldimethoxysilane as disclosed in the aforementioned Ewen et al. patent.

SUMMARY OF THE INVENTION

In accordance with the present invention there are provided novel processes for the formulation of Ziegler-type catalysts from catalyst components involving various orders of addition and mixing times between the several catalyst components. The catalyst components utilized in carrying out the invention involve a transition metal component, an electron donor component, and a co-catalyst component which are sequentially mixed together in the course of formulating the Ziegler-type catalyst to be charged to an olefin polymerization reactor.

Preferably, in carrying out the invention, an order of addition is used in which the co-catalyst component is initially contacted with either of the transition metal catalyst or the electron donor component. The initial mixing is carried out :for a first contact time within the range of 5–120 seconds and preferably 5–60 seconds. This initial mixture is then contacted with the remainder of the electron donor or transition metal component for a second contact time of less than 110 seconds and usually less than 40 seconds. Preferably, the second contact time is of a duration which is shorter than the initial contact time and near zero, that is, for only a second or so as is necessary to achieve good mixing. Here, the second contact can be less than five seconds. The mixture of the three components is then contacted with an olefin to effect polymerization of the olefin in the presence of the thus formulated Ziegler-type catalyst.

In one embodiment of the invention, the transition metal catalyst component and the co-catalyst component are mixed with one another for an initial contact time within the range of 5–120 seconds. The mixture resulting from this initial contact is then contacted with an electron donor component for a second contact time of no more than 30 seconds. The resulting mixture then is contacted with an olefin to effect polymerization of the olefin in the presence of the thus formulated Ziegler-type catalyst. Preferably, the olefin contacting step involves an initial pre-polymerization reaction to effect pre-polymerization of the catalyst prior to introducing the resulting pre-polymerized catalyst into a polymerization reactor containing an olefin.

In a further aspect of the invention, the orders of additions are as described previously with the contact between the transition metal component and the co-catalyst component extending for a first contact time followed by subsequent contact of the resulting mixture with an electron donor for a second contact time having a duration shorter than the first contact time. In a preferred embodiment, the first contact time is at least 20 seconds and more preferably, 20–40 seconds; the second contact time is no more than 30 seconds.

In another embodiment of the invention, the orders of addition are changed from those described above to provide a procedure in which the electron donor component is initially contacted with the co-catalyst component. Here, the initial contact time is within the range of 5–120 seconds and preferably, 5–40 seconds. At the conclusion of the initial contact time, the resulting mixture is then contacted with the transition metal component for a second contact time preferably ranging up to 30 seconds, although longer second contact times of up to 110 seconds can be used under certain circumstances.

In yet a further embodiment of the invention, the orders of additions of the several components are such that the electron donor component is initially contacted with the transition metal catalyst component for a first contact time ranging up to 40 seconds and preferably 5–20 seconds. At the conclusion of this first contact time, the resulting mixture is then contacted with the co-catalyst component for a second contact time ranging up to 20 seconds and of a duration shorter than the first contact time.

As described previously, at the conclusion of the second contact time for various orders of addition, the resulting three component mixture is then contacted with an olefin to effect polymerization thereof in the presence of the catalyst mixture. For each of the various orders of addition it is preferred that a pre-polymerization step be carried out prior to introducing the catalyst into the main reactor. Preferably, the pre-polymerization is carried out for a relatively short period, usually of a duration of less than a minute and preferably less than 20 seconds.

DETAILED DESCRIPTION OF THE INVENTION

Figure 1:
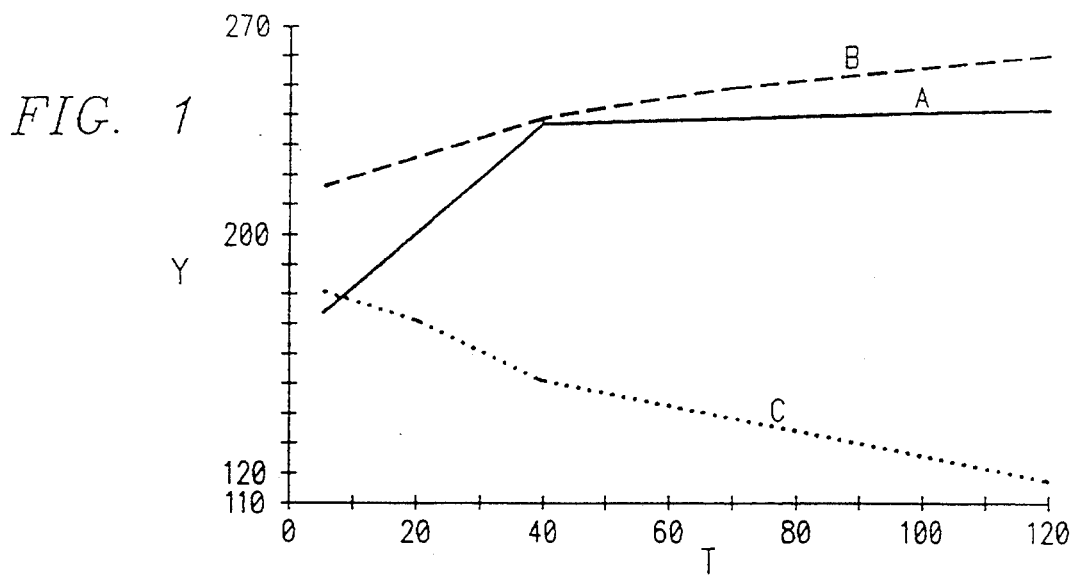
FIGS. 1 and 2 are graphical presentations of yield for various orders of addition as a function of the first and second precontact times, respectively.

In the polymerization of unsaturated hydrocarbons over Ziegler-type catalysts, a desideratum common to all such processes, is a high yield of polymer, commonly expressed in terms of catalyst activity. Catalyst activity is normally in terms of grams of polymer per gram of transition metal per hour.

A second important characteristic in polymer production is the bulk density of the polymer. The bulk density, commonly expressed in terms of grams per cubic centimeter, should be relatively high. If the bulk density is too low, the polymer will tend to be "fluffy" and will tend to cause plugging and handling problems in the product transfer system. This is particularly important in a continuous or a semi-continuous polymerization where plugging of the withdrawal outlet or another point in the polymerization system can cause serious interruptions in production schedules.

Yet a third important polymer characteristic which is particularly significant in the case of alpha olefins containing three or more carbon atoms is the crystallinity of the polymer product. By way of example, in the polymerization of propylene, the resulting polymer product can be isotactic, syndiotactic or atactic. Syndiotactic and isotactic polymers are crystalline and are insoluble in hydrocarbons solvents such as xylene. Atactic polymers, on the other hand, are amorphous, waxy-type materials which exhibit high solubility in xylene.

As described, for example, in U.S. Pat. No. 4,892,851 to Ewen et al., isotactic and syndiotactic polymers are regular repeatable structures which can be characterized in terms of the Fischer projection formula as described below. In the isotactic structure, all of the methyl groups attached to the tertiary carbon atom of the successive monomer units lie on the same side of a hypothetical plane extending through the main chain of the polymer as indicated schematically by the following two-dimensional representation.

(1)

For syndiotactic structures, the methyl groups attached to the tertiary carbon atoms on successive monomer units lie on alternative sides of the hypothetical plain is as follows:

(2)

For structure (1) above, the isotactic arrangement may be described employing Bovey's NMR nomenclature as—mmmm—in which each m represents a "meso" dyad of two successive methyl groups on the same side of the plane. Using this same nomenclature, the syndiotactic structure (2) above, may be described as—rrrr—, with each r indicating a "racemic" dyad of two successive methyl groups on opposite sides of the hypothetical plane. Of course, similar characterizations may be made for other polymers such as polystyrene or polyvinyl chloride. The non-crystalline atactic polymers involve randomly irregular structures. For a further description of other characterizations of atactic, isotactic and syndiotactic polymers, reference may be had to the aforementioned Patents Nos. 4,794,096 and 4,892,851, the entire disclosures of which is incorporated herein by reference.

From the foregoing description, it will be recognized that the crystallinity of a polymer such as polypropylene can be characterized in terms of the percentage of the polymer which is soluble in xylene. For highly crystalline isotactic or syndiotactic polypropylene, with few atactic imperfections, the percent of the polymer soluble in xylene will be quite low, typically on the order of 4% or less and sometimes, below 3%. As the polymer chain becomes more atactic, xylene solubles can range to figures well in excess of 5%, which indicates polymers, while still retaining good structural integrity, having a high degree of atactic imperfections.

The present invention may be carried out employing individual catalyst components which are, in themselves, well known to those skilled in the art. As described previously, there are a wide variety of transition metal catalysts known to be useful in olefin polymerization and such transition metal catalysts may be employed in the present invention. As a practical matter, it usually will be desirable to use a supported catalyst component and while a supported catalyst component which does not require an internal electron donor, as described, for example, in the aforementioned 4,476,289 to Mayr et al., may be used, it normally is preferred to employ a supported transition metal catalyst incorporating an internal electron donor as described in the aforementioned Mayr et al. Patent 4,636,486. The Ziegler transition metal catalysts include, as is well known in the art, salts of transition metals found in Groups 4, 5 and 6 (New Notation) of the Periodic Table of Elements. In addition to the titanium, zirconium and hafnium transition metal components commonly employed in olefin polymerizations, other such transition metals proposed for use in commercial Ziegler-type catalysis include vanadium, niobium, and chromium.

Like the transition metal component, the co-catalyst components employed in the present invention can also be selected from materials which are old and well known in the art. They can include metal alkyls, metal alkyl halides and substituted alkyls which can include Group 1 metals such as lithium, sodium and potassium, Group 2 metals such as beryllium, and magnesium, Group 12 metals such as zinc and cadmium and Group 13 metals such as aluminum and gallium. Again, as a practical matter, the co-catalyst will usually take the form of an aluminum alkyl or aluminum alkyl halide, which, in some cases, may be complexed with another metal alkyl such as a lithium alkyl. Probably the most widely used co-catalysts are trimethylaluminum (TMA) and triethylaluminum (TEAL) with the latter normally being preferred as a co-catalyst in the polymerization of $C_3+$ alpha olefins such as in the production of polypropylene, propylene co-polymers, polyvinylchloride, and the like.

For a general discussion of transition metal and co-catalyst components in Ziegler catalysis, reference is made to Boor, John "Ziegler-Natta Catalysts in Polymerizations", Academic Press, Inc., New York (1979) and particularly, Chapter 4 entitled "Chemical Description of Ziegler-Natta Catalysts for Olefins".

Numerous electron donors may be employed in carrying out the present invention. The electron donors used are Lewis bases which function in the nature of external electron donors as described previously. A wide variety of such Lewis bases are well known in the art. Preferably, the electron donor used here will take the form of organic silicon-containing compounds such as organic siloxanes or silanes, including silyl ethers and esters such as alkyl or arylalkyl alkoxysilanes. Particularly suitable examples include methyl cyclohexyl dimethoxysilane, isobutyl trimethoxysilane and diphenyl dimethoxysilane. Other suitable catalyst components which can be used in carrying out the invention are disclosed in the aforementioned Patents Nos. 4,287,328 to Kikuta et al., 4,567,155 to Tovrog et al., 4,316,966 to Mineshima et al., and 4,927,797 to Ewen, the entire disclosures of which are incorporated herein by reference.

Specific applications of the present invention involve the formulation of Ziegler-type catalysts by mixing the various components thereof under certain specific orders of additions and contact times between components when going from one contacting step to another. After the several components are mixed together, the resulting multi-component catalyst is then contacted with the unsaturated monomer, preferably an alpha olefin, to effect polymerization of the monomer in the presence of the Ziegler-type catalyst. Preferably, the initial olefin contacting step subsequent to formulation of the composite catalyst is a prepolymerization step with the resulting pre-polymerized catalyst then being supplied to a polymerization reactor to produce the desired polymer product.

The polymerization process may be carried out as either a batch-type, continuous, or semi-continuous process, but preferably, polymerization of the olefin monomer (or monomers) will be carried out in a loop-type reactor of the type disclosed in the aforementioned Patent No. 4,767,735 to Ewen et al. As described in the Ewen et al. patent, when the catalyst components are formulated together, they are supplied to a linear tubular pre-polymerization reactor where they are contacted for a relatively short time with the pre-polymerization monomer prior to being introduced into the main loop-type reactor. By way of example, the residence time of the catalyst and monomer within the pre-polymerization reactor will be normally less than a minute, and usually within the range of a few seconds to perhaps 20 seconds. In the experimental work described hereinafter, the catalyst components, after being combined to form the Ziegler-type catalysts, were pre-polymerized for a period of five seconds. Durations of this nature will be suitable in many commercial applications.

In practice, the most significant application of the present invention will be in the polymerization of $C_3+$ alpha olefins and particularly those polymerizations involving propylene, either alone or with another olefin, for example ethylene, to produce polypropylene or copolymers such as ethylene/propylene co-polymer. The preferred transition metal components will be in the form of the titanium, zirconium or hafnium halides with supported tetravalent components such as titanium tetrachloride, being used in most commercial applications. Supports will normally take the form of a magnesium or zinc dihalide, dialkyl or dialkoxide such as magnesium dichloride or magnesium diethoxide, which may include magnesium alkoxide halides such as magnesium diethoxychloride. The co-catalyst in such applications will normally take the form of a trialkyl aluminum such as TEAL or TMA as described previously, and the electron donor, a siloxane or silane, and more specifically, cyclohexylmethyldimethoxysilane as described previously.

The orders of addition and the contact times for the various orders of addition can be tailored to arrive at the desired characteristics of the final polymer product. The results of the various orders of addition and modes of operations will be apparent from the results of the experimental work described below. In general, it has been found that the order of addition in which the transition metal catalyst component and the co-catalyst component are mixed together first for a first contact time within the range of 5 to 120 seconds, followed by contact with the electron donor for a second contact time of about 30 seconds or less, and preferably a duration which is shorter than the first contact time, produces the best overall results in terms of polymer yield, polymer bulk density, and crystallinity as measured by a low xylene content.

Considering all three of the above-described parameters, the second most favorable order of addition of the catalyst components involves initially mixing the electron donor and the co-catalyst followed by contacting the resulting mixture with the transition metal catalyst component. Here, the bulk density is somewhat lower and the xylene solubles of the polymer product somewhat higher than in the case of the first order of addition. However, the polymer yield for this secondary order of addition can be forced somewhat higher than for the first order of addition and thus, this embodiment of the invention can be employed where the yield is of paramount concern.

The tertiary order of addition involving first mixing the catalyst and electron donor and then contacting this mixture with the co-catalyst yields results which, in general, are not as good as those achieved by the first two orders of additions. However, where xylene solubles are of paramount concern, an extremely low xylene soluble content can be achieved by using very short contact times in conjunction with this tertiary order of addition.

The significance of and advantages achieved by the various orders of additions and contact times employed in accordance with the present invention are further indicated by the experimental work described below. In this experimental work, the transition metal catalyst component was a supported titanium tetrachloride catalyst formulated on a magnesium-based support and incorporating N-dibutylphthalate as an internal electron donor. The catalyst had a titanium content of about 2 wt. %. Catalysts of this general nature are known in the art as evidenced, for example, by the aforementioned Patent No. 4,927,797.

The co-catalyst used in the experimental work was triethylaluminum (TEAL), which as noted previously, is a conventional co-catalyst used in the polymerization of propylene. The co-catalyst as used in the experimental work was a 0.2 molar solution of TEAL in hexane which had been freshly distilled and dried. The external electron donor used in the experimental work was cyclohexylmethyldimethoxysilane (CMDS) which was obtained from a commercial service and dried by absorption over a molecular sieve.

In the experimental work, the catalyst components were used in relative amounts of 10 mg of transition metal catalyst, 1 mmol of TEAL and 0.025 mmol of CMDS to provide an aluminum/titanium atomic ratio of 200 (Al/Ti=200) and an aluminum/silicon atomic ratio of 40 (Al/Si=40). As noted in co-pending application Ser. No. 846,930, filed of even date by the same inventors herein entitled "CATALYST FORMULATION AND POLYMERIZATION PROCESSES" the aluminum/titanium and aluminum/silicon ratios can be varied to impact catalyst yield and polymer properties such as molecular weight distribution and xylene solubles as well as catalyst yields. The results achieved by changing these parameters is disclosed in detail in the aforementioned co-pending application Ser. No. 846,930 to which reference is made. The Al/Ti and Al/Si ratios were maintained constant in the experimental work described in this application, thus providing good comparative indications of the effect of orders of additions and contact times on catalyst yield and also the polymer characteristics of bulk density and xylene soluble content, which as discussed previously, provides a measure of polymer crystallinity.

Each polymerization run was carried out for a period of one hour at 70° C. Preliminary to conducting the polymerization run, approximately 16 mmol of hydrogen under a pressure of 120 psig was discharged to an empty 2 L Zipperclave reactor which was dried and kept under an internal nitrogen pressure of 1-2 psig. Immediately after charging the reactor with hydrogen, 1 L of propylene was charged to the reactor which was then heated to 70° C. and stirred at 1,000 rpm to effect liquid phase polymerization of the propylene.

The catalyst components were contacted under the various orders of additions and contact times as described below using an arrangement of 4 series connected stainless steel bombs, each having a volume of 40 Ml and connected to one another in series through ¼ inch stainless steel ball valves. The several bombs used in this experimental study were connected in a manner as described in greater detail in co-pending U.S. patent application Ser. No. 646,698 entitled "CATALYST CONTACT PROCESSES" filed of even date by the inventors herein.

In the particular configuration used in the experimental work reported herein, four bombs were connected in series, with the first two bombs containing the catalyst components mixed together during the initial contacting step, the third bomb being empty, and the fourth bomb containing the catalyst component contacted in the second contact step with the initially formed mixture. The series connected bombs were arranged vertically so that flow from one chamber to the next was aided by gravity. The transition metal catalyst component was mixed with hexane in a hexane/catalyst suspension volume ratio of 5:1. In addition, hexane was also added to the chamber containing the electron donor solution in a hexane/electron donor solution volume ratio 4:1 in order to further ensure good mixing of the catalyst components. This protocol with gravity mixing (without agitation of the pre-mixing assembly), was employed in all of the test procedures in order to provide for consistency from one test to another.

Three order of addition protocols were used in carrying out the experimental work. The first, Protocol A, involved initial mixing of the catalyst and co-catalyst components with the co-catalyst discharged from the uppermost first chamber into the second chamber containing the transition metal catalyst component. The third chamber was, of course, empty as described previously, with the fourth lowermost chamber containing the electron donor.

The second protocol, designated herein as Protocol B, involved initial mixing of the co-catalyst in the first chamber, followed by the electron donor in the second chamber with the transition metal component incorporated into the fourth chamber. The final order of addition, Protocol C, involved displacement of the electron donor from the uppermost first chamber into the second chamber containing the transition metal catalyst and then into the third empty chamber, followed subsequently by displacement of the mixture into the fourth chamber containing the co-catalyst.

Immediately after contact of the first resulting submixture with the third component for the desired pre-contact time, the three component system was contacted with propylene to effect a five second room temperature pre-polymerization of the catalyst. The resulting pre-polymerized catalyst was then discharged into the Zipperclave reactor serving as the polymerization reactor. The pre-polymerization step was carried out by charging the four chamber pre-contact assembly with liquid propylene and after the five second pre-polymerization time, discharging the contents of the pre-contact assembly by pumping 600 Ml of propylene through the assembly and into the polymerization reactor. The total propylene used in the polymerization step was about 1.45 L. Some of the propylene was retained in the pre-contact assembly.

The results of the pre-mixing under Protocols A, B and C for various initial and secondary contact times are shown in Tables I, II and III, respectively. For each of the tests, the Al/Ti and Al/Si ratios were 200 and 40, respectively, and polymerization was carried out for one hour at 70° C. In Tables I–III, the initial and secondary contact times $T_1$ and $T_2$ are shown in seconds in the first and second columns. The amount of polymer produced in grams is shown in the third column, and the bulk density in grams per cubic centimeter is shown in the fourth column. The melt flow index in grams per 10 minutes for the polymer product is shown in the fifth column and the weight percent of the polymer soluble in xylene is shown in the last column.

TABLE I

| | | (Protocol A) | | | |
|---|---|---|---|---|---|
| $T_1$ | $T_2$ (sec) | Yield (gms) | b.d. | MFI | % XS |
| 5 | 30 | 174 | 0.47 | 2.06 | 3.32 |
| 10 | 30 | 184 | 0.46 | 2.08 | 3.20 |
| 40 | 30 | 238 | 0.47 | 2.10 | 3.51 |
| 120 | 30 | 242 | 0.46 | 1.91 | 3.11 |
| 40 | 0 | 276 | 0.48 | 2.00 | 3.19 |
| 70 | 0 | 256 | 0.49 | 2.19 | 3.16 |
| 20 | 50 | 278 | 0.42 | 2.59 | 3.12 |
| 20 | 80 | 270 | 0.46 | 2.14 | 2.32 |

TABLE I-continued (Protocol A)

| T₁ | T₂ (sec) | Yield (gms) | b.d. | MFI | % XS |
|---|---|---|---|---|---|
| 40 | 60 | 216 | 0.45 | 2.28 | 3.44 |
| 40 | 110 | 214 | 0.42 | 2.16 | 3.24 |

TABLE II (Protocol B)

| $T_1$ | $T_2$ (sec) | Yield (gms) | b.d. | MFI | % XS |
|---|---|---|---|---|---|
| 5 | 30 | 217 | 0.46 | 2.48 | 3.55 |
| 40 | 30 | 240 | 0.44 | 2.68 | 3.87 |
| 70 | 30 | 250 | 0.42 | 2.51 | 4.07 |
| 120 | 30 | 261 | 0.39 | 4.72 | 5.88 |
| 40 | 0 | 242 | 0.46 | 2.57 | 3.83 |
| 70 | 0 | 296 | 0.40 | 2.73 | 3.16 |
| 20 | 50 | 221 | 0.43 | 2.38 | 3.35 |
| 20 | 80 | 258 | 0.41 | 3.28 | 4.31 |
| 40 | 60 | 224 | 0.44 | 2.49 | 3.04 |
| 40 | 110 | 237 | 0.34 | 4.44 | 6.39 |

TABLE III (Protocol C)

| $T_1$ | $T_2$ (sec) | Yield (gms) | b.d. | MFI | % XS |
|---|---|---|---|---|---|
| 5 | 30 | 182 | 0.44 | 3.58 | 4.32 |
| 20 | 30 | 172 | 0.42 | 3.14 | 4.72 |
| 40 | 30 | 151 | 0.42 | 3.22 | 4.47 |
| 120 | 30 | 118 | 0.43 | 2.53 | 3.99 |
| 40 | 0 | 196 | 0.45 | 1.93 | 2.24 |
| 70 | 0 | 176 | 0.45 | 1.93 | 2.40 |

Table IV illustrates additional results carried out for Protocol C, but using polypropylene from a different source than the polypropylene used in the experimental work reported in Tables I, II, and III. Experimental results vary from one propylene source to another. Accordingly, it is considered prudent to not rely upon a direct cross correlation in comparing the experimental results attained with the second propylene source with those obtained with the first propylene source. However, the work reported in Table IV can be considered with the work reported to Table III to show the results of varying the secondary contact time for Protocol C.

TABLE VI (Protocol C)

| $T_1$ | $T_2$ | Yield (gms) | b.d. | % XS | MFI |
|---|---|---|---|---|---|
| 20 | 30 | 244 | 0.43 | 3.28 | 2.70 |
| 40 | 30 | 152 | 0.40 | 3.96 | 3.12 |
| 20 | 50 | 167 | 0.40 | 7.11 | 5.26 |
| 20 | 80 | 129 | 0.37 | 6.18 | 4.74 |
| 40 | 60 | 108 | 0.32 | 8.79 | 6.45 |
| 40 | 110 | 135 | 0.38 | 7.95 | 5.46 |

Turning now to the drawings, FIGS. 1 through 6 present graphical representations of the results of the experimental work in terms of the durations of the first precontact time with the second precontact time held constant at 30 seconds and as a function of the second precontact time with the first precontact time held constant at 40 seconds. In each of FIGS. 1 through 6, the graphs are labelled by the legends A, B, and C to correspond to the order of addition Protocols A, B, and C, as described above. Thus, in FIG. 1, for example, curve A is a plot of polymer yield, Y, in grams on the ordinate as a function of the duration of the first precontact time, T, in seconds on the abscissa for the order of addition of the transition metal catalyst mixed initially with the co-catalyst, followed by contact of this mixture with the electron donor. Curve B is a graphical presentation of this same data for the order of addition in which the electron donor and co-catalyst are mixed first followed by addition of the transition metal catalyst and curve C shows the yield for the order of addition in which the transition metal catalyst component and the electron donor are initially mixed together, with this sub-mixture then contacted with the co-catalyst.

Figure 2:
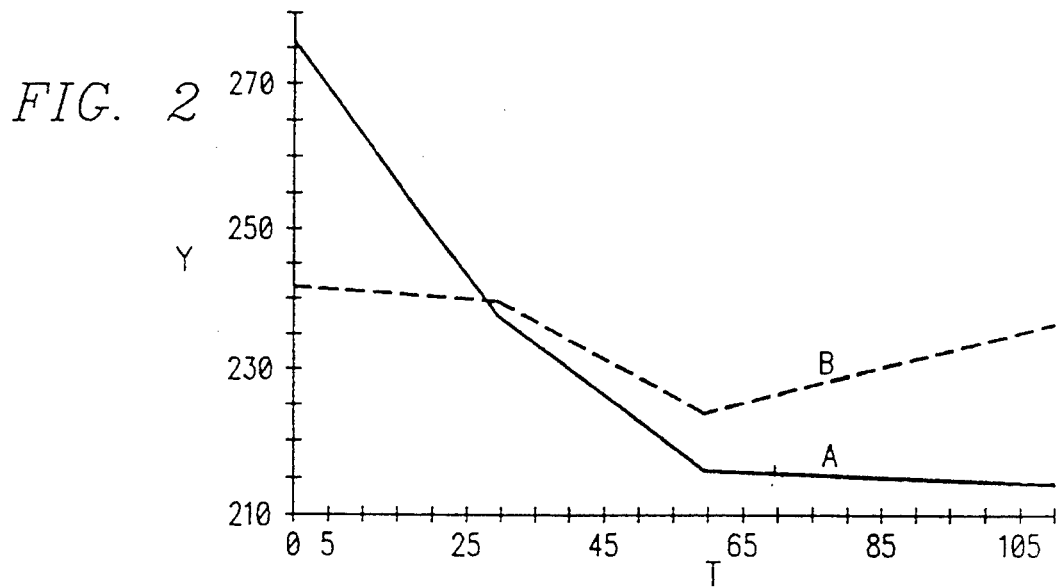
Figure 3:
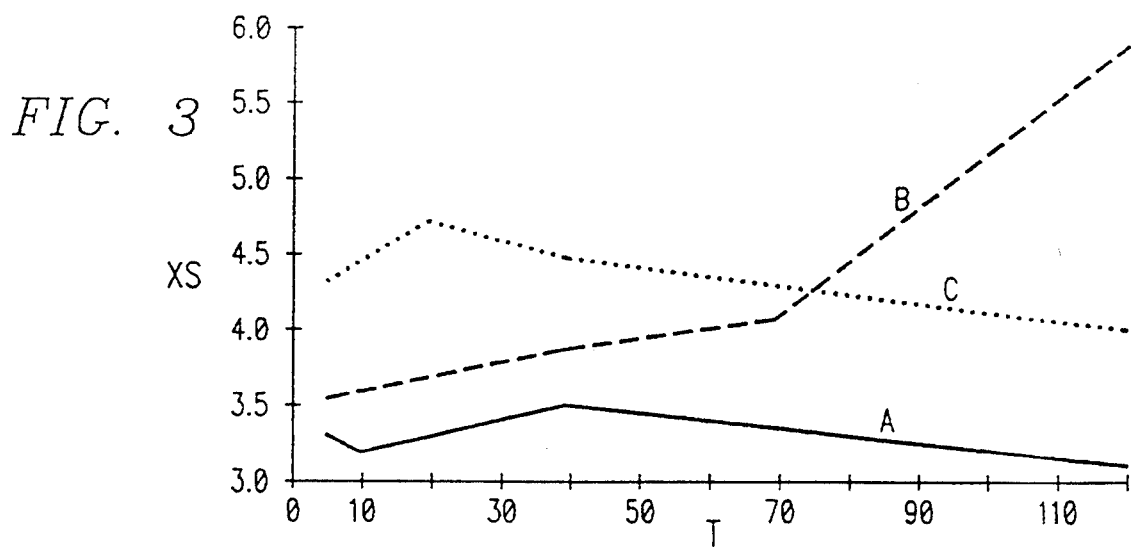
FIGS. 3 and 4 are graphs illustrating the xylene soluble content of the polymer products for various orders of addition as a function of the first and second precontact times, respectively.
Figure 4:
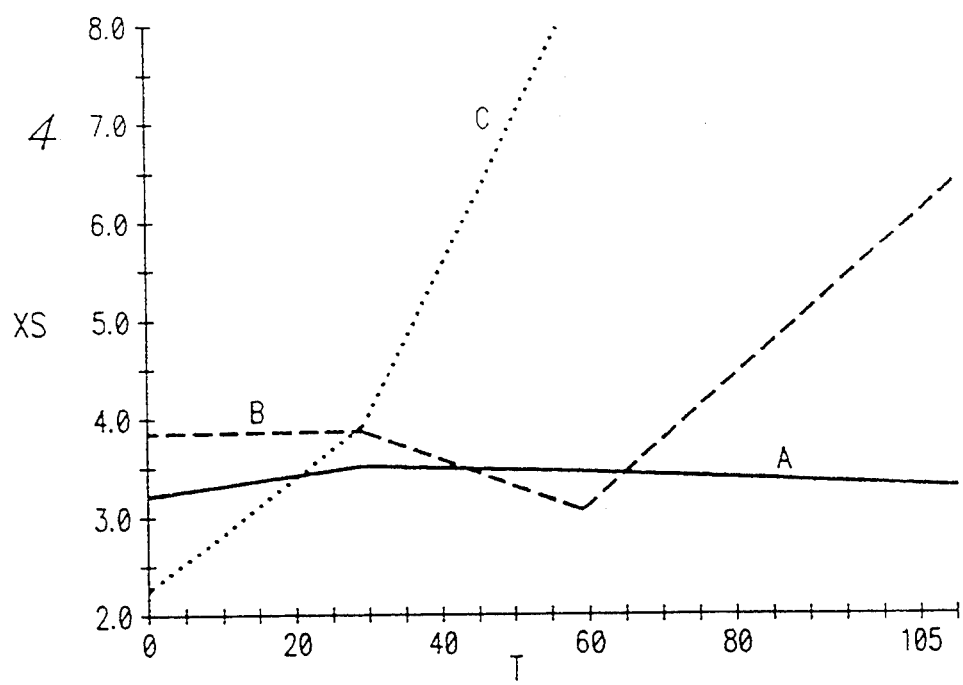
Figure 5:
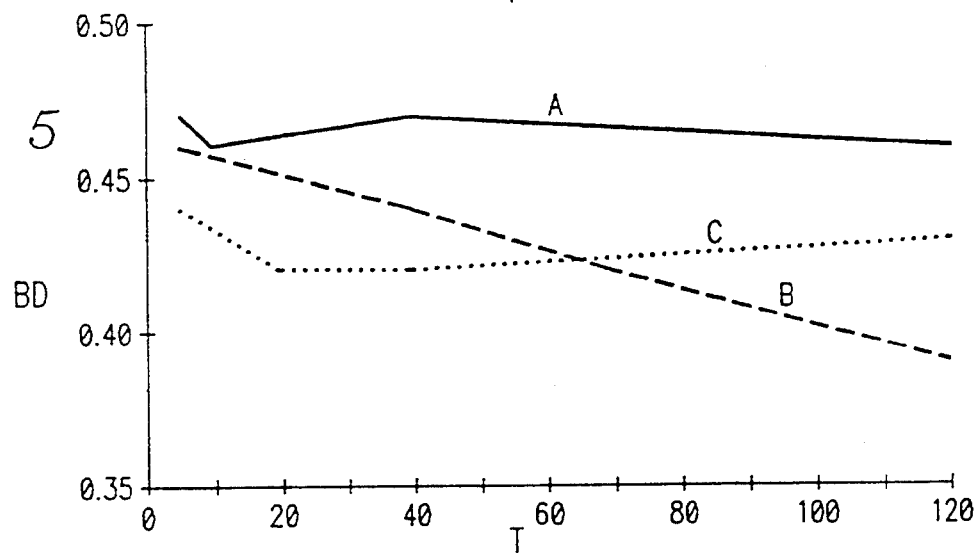
FIGS. 5 and 6 are graphical representations of the bulk density of the polymer product for the various orders of addition as a function of the first and second precontact times, respectively.
Figure 6:
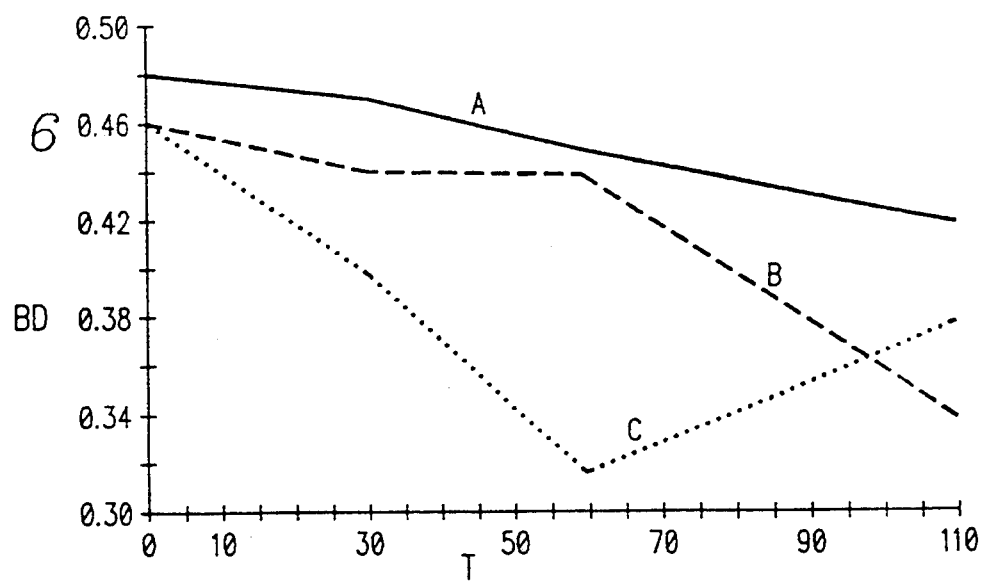

In FIGS. 1 and 2 the yield in grams, Y, is plotted on the ordinate versus the time, T, in seconds on the abscissa. In FIGS. 3 and 4, the xylene soluble content, XS, in weight percent is plotted on the ordinate versus the time, T, in seconds on the abscissa, and in FIGS. 5 and 6 the bulk density, .B.D., in g/cm³ is plotted on the ordinate versus the time in seconds on the abscissa. In FIGS. 1, 3 and 5, the time on the abscissa is the first precontact time with the second precontact time held constant at 30 seconds. In FIGS. 2, 4, and 6, the time is the duration of the second contact time with the first precontact time held constant at 40 seconds.

As illustrated in FIG. 1, the polymer yields for Protocols A and B generally increased as the first precontact time increased. The reverse was true for Protocol C. For very short first precontact times Protocol B offered a substantially better yield than Protocol A. However, as the precontact time lengthened to about 30 seconds and beyond, the yields were roughly comparable.

As shown in FIG. 2, Protocol A suffered a dramatic loss in activity with an increase in the second precontact time. In general, for second contact times of about 30 seconds or less, the yield is very high for Protocol A and generally as good as or better than the yield for Protocol B, which remains fairly level across the range of second contact times. The yield for Protocol C is not illustrated in FIG. 2, but would be well below that for Protocols A and B based upon the experimental work reported in Tables III and IV using the different propylene sources as described above.

As shown in FIGS. 3 and 4, Protocol A in which the transition metal catalyst and co-catalyst are mixed initially, show consistently low xylene solubles across the ranges measured for both the first and second precontact times. In every case the xylene content was about 3.5 % or less. For Protocol B, in which the electron donor and co-catalyst were initially mixed, the xylene solubles stayed generally low so long as the contact times during the first and second mixing steps were not allowed to become too great. An exception, however, was noted for a second precontact time of 60 seconds, where, as shown in FIG. 4, the xylene solubles content reached a minimum of about 3 %. As is shown by a consideration of FIGS. 3 and 4 together, for the Protocol in which the electron donor and co-catalyst are mixed together initially, too long of durations for both the first and second contact times result in increasing xylene solubles content. In general, the third order of addition in which the transition metal catalyst component and electron donor are contacted first, .results in relatively high xylene solubles contents which are moderately high for relatively short initial contact times and extremely high for the longer second contact times as shown in FIG. 4.

As shown in FIGS. 5 and 6, the bulk density remained high for Protocol A, regardless of the duration of the first contact time. The highest bulk densities were obtained for Protocol A across the range of second contact times, although the bulk density did decrease moderately as the second contact time increased in length. Over the entire span of contact times, Protocol B produced slightly lower to substantially lower bulk densities than those achieved by Protocol A, although they were generally better than the bulk densities resulting from Protocol C. For both Protocols A and B, the bulk density progressively decreases with an increase in the second precontact time.

The melt flow data reported in Tables I–IV did not appear to indicate any clear correlation of the melt flow index with the various orders of addition between the three catalyst components and this parameter is not illustrated graphically. In general, an increase in xylene solubles was found to generally correspond to an increase in melt flow index.

As a general rule, the order of addition in which the transition metal component and the co-catalyst are mixed together first, followed by addition of the electron donor, is preferred since this produces the best overall results when yield, bulk density, and xylene solubles content are considered together. As noted previously, the preferred first contact time here is from about 20 to 40 seconds. However, longer contact times can be readily used in this protocol since the most important parameter here appears to be the second contact time. The second contact time should be relatively short, preferably no more than 30 seconds, and usually the second contact time can range down to near zero. That is, the second contact time need only be so long as is necessary to ensure good mixing of the components before the prepolymerization step. However, where yield is of paramount concern, the order of addition involving the mixing together initially of the electron donor and co-catalyst may be employed. Here, the first contact time ranges from about 5 to 120 seconds, but preferably is within the range of 5–40 seconds. The second contact time, as noted previously, preferably is shorter than the first, ranging from near zero to 30 seconds. Here, the very short contact times for both mixing steps can be employed consistent with obtaining good homogeneous mixtures of the catalyst components.

The order of addition in which the transition metal component and the electron donor are mixed together first will usually not be employed since the results in terms of yield and bulk density, and usually in terms of xylene solubles, is not as good as those achieved employing the other orders of addition. An exception to this, however, is in the circumstances in which a low xylene soluble content of the polymer is Of paramount importance. Here, by maintaining the second contact time at a duration which is short in relation to the first contact time and also short in absolute value, extremely low xylene solubles can be attained. In addition, the bulk density can be kept to a reasonably high level. Preferably, the first contact time in this embodiment of the invention is kept to durations within the range of 5–20 seconds. The second contact time should be of a duration shorter than the first. It is particularly preferred in order to achieve the advantage of an extremely low xylene content while sacrificing little or no loss in bulk density to keep the second precontact time to zero; that is, to carry out the invention so that the co-catalyst is added to the catalyst donor mixture in the presence of the propylene or other alpha olefin during the prepolymerization step.

Having described specific embodiments of the present invention, it will be understood that modifications thereof may be suggested to those skilled in the art, and it is intended to cover all such modifications as fall within the scope of the appended claims.

We claim:

1. In a process for formulating a mixture of a Ziegler catalyst comprising a transition metal component incorporating a group 4, 5, or 6 transition metal which is effective as an olefin polymerization catalyst, an electron donor component, and a co-catalyst component to be charged to a polymerization reactor, the steps comprising;
   (a) contacting said co-catalyst component with either one of said transition metal catalyst component and said electron donor component for a first contact time within the range of 50–120 seconds;
   (b) subsequent to step (a), contacting the mixture produced by step (a) with the other of said transition metal catalyst component and said electron donor component for a second contact time of no more than 110 seconds;
   (c) thereafter contacting the mixture of step (b) with an unsaturated hydrocarbon to effect the polymerization thereof in the presence of said Ziegler catalyst.

2. The method of claim 1, wherein said second contact time is less than the first contact time.

3. The method of claim 1, wherein said second contact time is less than 40 seconds.

4. The method of claim 1, wherein step c) comprises an initial prepolymerization reaction with a $C_2$–$C_4$ olefin to effect pre-polymerization of said catalyst and thereafter introducing said pre-polymerized catalyst into a polymerization reactor containing a $C_2$–$C_4$ olefin.

5. The method of claim 4, wherein said contact step of step (c) to effect said pre-polymerization is carried out for a time period of less than one minute.

6. The method of claim 4, wherein said transition metal component and said co-catalyst component are contacted in step (a).

7. The method of claim 4, wherein said electron donor component and said co-catalyst component are contacted in step (a).

8. The method of claim 1 wherein said transition metal component is a halide of titanium, zirconium, hafnium, or vanadium.

9. In a process for formulating a mixture of a Ziegler catalyst comprising a transition metal catalyst component incorporating a group 4, 5, or 6 transition metal which is effective as an olefin polymerization catalyst, an electron donor component, and a co-catalyst component to be charged to an olefin polymerization reactor, the steps comprising:
   (a) contacting said Ziegler transition metal catalyst component and said co-catalyst component for a first contact time within the range of 5–120 seconds;
   (b) subsequent to step (a) contacting the mixture produced by step a) with an electron donor component for a second contact time of no more than 30 seconds; and
   (c) thereafter contacting the mixture of step (b) with an olefin to effect polymerization of said olefin in the presence of said Ziegler catalyst.

10. The method of claim 9, wherein the duration of said second contact time is less than said first contact time.

11. The method of claim 9, wherein said olefin contact step of step c) is an initial pre-polymerization reaction to effect pre-polymerization of said catalyst with a $C_2$–$C_4$ olefin and thereafter introducing said pre-polymerized catalyst into a polymerization reactor containing a $C_2$–$C_4$ olefin.

12. In a process for formulating a mixture of a Ziegler catalyst comprising a transition metal component incorporating a group 4, 5, or 6 transition metal which is effective as an olefin polymerization catalyst, an electron donor component, and a co-catalyst component to be charged to a polymerization reactor, the steps comprising;
   (a) contacting said transition metal catalyst component and said co-catalyst component for a first contact time of having a duration of at least 7 seconds;
   (b) subsequent to step (a), contacting the mixture produced by step (a) with an electron donor component for a second contact time having a duration which is shorter than said first contact time; and
   (c) thereafter contacting the mixture of step Co) with an olefin to effect polymerization of said olefin in the presence of said Ziegler catalyst.

13. The method of claim 12, wherein the duration of said first contact time is at least 40 seconds.

14. The method of claim 12, wherein the duration of said second contact time is no more than 30 seconds.

15. The method of claim 12, wherein said olefin contact step of step (c) is an initial pre-polymerization reaction to effect pre-polymerization of said catalyst with a $C_2$–$C_4$ olefin and thereafter introducing said pre-polymerized catalyst into a polymerization reactor containing a $C_2$–$C_4$ olefin.

16. The method of claim 15, wherein said contact step of step (c) to effect said pre-polymerization is carried out for a time period of less than one minute.

17. The method of claim 12, wherein said olefin comprises a $C_2$–$C_4$ alpha olefin.

18. The method of claim 17, wherein said transition metal component is a halide of titanium, zirconium, hafnium or vanadium.

19. The method of claim 18, wherein said transition metal component is a titanium tetrahalide supported on a magnesium or zinc based support.

20. The method of claim 17, wherein said co-catalyst is an aluminum alkyl or an aluminum alkyl halide.

21. The method of claim 20, wherein said co-catalyst is selected from the group consisting of trimethylaluminum and triethylaluminum.

22. The method of claim 12, wherein said electron donor is an organo silane or siloxane.

23. The method of claim 22, wherein said electron donor is an organodialkoxysilane.

24. The method of claim 23, wherein said electron donor is cyclohexalmethyldimethoxysilane.

25. The method of claim 24, wherein said co-catalyst is triethylaluminum.

26. The method of claim 25, wherein said transition metal catalyst component is a tetrahalide of titanium, zirconium, or hafnium supported on a magnesium or zinc base.

27. In a process for formulating a mixture of a Ziegler catalyst comprising a transition metal component incorporating a group 4, 5, or 6 transition is effective as an olefin polymerization catalyst, an electron donor component, and a co-catalyst component to be charged to a polymerization reactor, the steps comprising;
   (a) contacting said electron donor component with said co-catalyst component for a first contact time within the range of 5–120 seconds;
   (b) at the conclusion of said first contact time, contacting the mixture produced in step (a) with said transition metal catalyst component for a second contact time of up to 110 seconds; and
   (c) at the conclusion of said second contact time, contacting the mixture produced in step (b) with an olefin to effect polymerization of said olefin in the presence of said Ziegler catalyst mixture.

28. The method of claim 27, wherein the duration of said second contact time is no longer than 30 seconds.

29. The method of claim 28, wherein the duration of said first contact time is within the range of 5–40 seconds.

30. The method of claim 27, wherein said olefin contact step of step c) is an initial pre-polymerization reaction to effect pre-polymerization of said catalyst with a $C_2$–$C_4$ olefin and thereafter introducing said pre-polymerized catalyst into a polymerization reactor containing a $C_2$–$C_4$ olefin.

31. In a process for formulating a mixture of a Ziegler catalyst comprising a transition metal catalyst component incorporating a group 4, 5, or 6 transition metal which is effective as an olefin polymerization catalyst, an external electron donor component and a co-catalyst component to be charged to an olefin polymerization reactor, the steps comprising:
   (a) contacting said transition metal catalyst component with said external electron donor component for a first contact time of no more than 40 seconds;
   (b) at the conclusion of said first contact time contacting the mixture produced in step (a) with said co-catalyst component for a second contact time within the range of no more than 20 seconds and which has a duration shorter than said first contact time; and
   (c) contacting the mixture produced in step (b) with an olefin to effect polymerization of said olefin in the presence of said Ziegler catalyst mixture.

32. The method of claim 31, wherein said first contact time is within the range of 5–20 seconds.

33. The method of claim 31, wherein step (b) is carried out in the presence of an olefin.

34. The method of claim 12, wherein said olefin comprises propylene.

35. The method of claim 27 wherein said transition metal component is a halide of titanium, zirconium, hafnium, or vanadium.

36. The method of claim 31 wherein said transition metal component is a halide of titanium, zirconium, hafnium, or vanadium.

* * * * *